US012354576B2

(12) United States Patent
Wang et al.

(10) Patent No.: US 12,354,576 B2
(45) Date of Patent: Jul. 8, 2025

(54) ARTIFICIAL INTELLIGENCE MUSIC GENERATION MODEL AND METHOD FOR CONFIGURING THE SAME

(71) Applicant: Futureverse IP Limited, Auckland (NZ)

(72) Inventors: Yijun Wang, Auckland (NZ); Yao Yao, Shenzhen (CN); Peike Li, Sydney (AU); Boyu Chen, Sydney (AU); David McDonald, Auckland (NZ); Nicolas Fourrier, Auckland (NZ); Erin Zink, Phoenix, AZ (US); Aaron McDonald, Auckland (NZ); Yilun Wang, Auckland (NZ)

(73) Assignee: Futureverse IP Limited, Auckland (NZ)

( * ) Notice: Subject to any disclaimer, the term of this patent is extended or adjusted under 35 U.S.C. 154(b) by 0 days.

(21) Appl. No.: 18/796,182

(22) Filed: Aug. 6, 2024

(65) Prior Publication Data

US 2025/0054473 A1 Feb. 13, 2025

Related U.S. Application Data

(60) Provisional application No. 63/531,693, filed on Aug. 9, 2023.

(51) Int. Cl.
*G10H 1/00* (2006.01)

(52) U.S. Cl.
CPC ..... *G10H 1/0025* (2013.01); *G10H 2210/111* (2013.01); *G10H 2250/311* (2013.01)

(58) Field of Classification Search
CPC ........... G10H 1/0025; G10H 2210/111; G10H 2250/311

(Continued)

(56) References Cited

U.S. PATENT DOCUMENTS 11,080,591 B2 * 8/2021 van den Oord ........ G06N 3/084
11,164,109 B2 11/2021 Browne et al.

(Continued)

FOREIGN PATENT DOCUMENTS

CA 3150262 A1 3/2021
CN 116072098 A * 5/2023 ........... G10H 1/0025

(Continued)

OTHER PUBLICATIONS

Agostinelli, A. et al.: "MusicLm: Generating music from text", arXiv preprint arXiv:2301.11325, 2023.

(Continued)

*Primary Examiner* — Christina M Schreiber
(74) *Attorney, Agent, or Firm* — Potomac Law Group, PLLC; Marc S. Kaufman

(57) ABSTRACT

The present disclosure provides a method for configuring a learning model for music generation and the corresponding learning model. The method includes training a masked autoencoder with training data comprising a combination of a reconstruction loss over time and frequency domains and a patch-based adversarial objective operating at different resolutions. An omnidirectional latent diffusion model is trained based on music data represented in a latent space to obtain a pretrained diffusion model. The pretrained diffusion model is fine-tuned based on text-guided music generation, bidirectional music in-painting, and unidirectional music continuation. The method enables high-fidelity music generation conditioned on text or music representations while maintaining computational efficiency.

14 Claims, 3 Drawing Sheets

(58) Field of Classification Search
USPC .......................................................... 84/616
See application file for complete search history.

(56) References Cited

U.S. PATENT DOCUMENTS

| | | | |
|---|---|---|---|
| 11,429,762 B2 | 8/2022 | Mallya Kasaragod et al. | |
| 11,710,027 B2 | 7/2023 | Zhu et al. | |
| 11,836,640 B2 | 12/2023 | Ji et al. | |
| 11,853,724 B2 | 12/2023 | Hunter | |
| 11,868,896 B2 | 1/2024 | Brown et al. | |
| 11,915,689 B1 * | 2/2024 | Agostinelli | G06N 3/09 |
| 2015/0023345 A1 * | 1/2015 | Schechner | G10L 15/02<br>370/352 |
| 2018/0357047 A1 | 12/2018 | Brown et al. | |
| 2020/0042879 A1 * | 2/2020 | Jansson | G10L 21/028 |
| 2020/0043518 A1 * | 2/2020 | Jansson | G06N 5/046 |
| 2021/0125398 A1 | 4/2021 | Bradley et al. | |
| 2021/0149958 A1 | 5/2021 | Hunter | |
| 2021/0247954 A1 | 8/2021 | Balassanian et al. | |
| 2021/0279957 A1 | 9/2021 | Eder et al. | |
| 2021/0357780 A1 | 11/2021 | Ji et al. | |
| 2022/0157294 A1 | 5/2022 | Li et al. | |
| 2022/0188810 A1 | 6/2022 | Doney | |
| 2022/0391635 A1 | 12/2022 | Lian et al. | |
| 2023/0009454 A1 | 1/2023 | Paciello | |
| 2023/0075884 A1 | 3/2023 | Jakobsson et al. | |
| 2023/0154090 A1 | 5/2023 | Bradley et al. | |
| 2023/0169080 A1 | 6/2023 | Iyer et al. | |
| 2023/0222777 A1 | 7/2023 | Jain et al. | |
| 2023/0281601 A9 | 9/2023 | Doney | |
| 2023/0282202 A1 | 9/2023 | Ahmed et al. | |
| 2023/0350936 A1 | 11/2023 | Alayrac et al. | |
| 2023/0385085 A1 | 11/2023 | Singh | |
| 2024/0096017 A1 | 3/2024 | Gao et al. | |
| 2024/0127775 A1 * | 4/2024 | Vechtomova | G06F 40/40 |
| 2024/0161470 A1 | 5/2024 | Sminchisescu et al. | |
| 2024/0161761 A1 * | 5/2024 | Islam | H04N 19/20 |
| 2024/0394511 A1 | 11/2024 | Thevenin et al. | |
| 2024/0419949 A1 * | 12/2024 | Aykut | G06N 3/088 |
| 2025/0054473 A1 * | 2/2025 | Wang | G10H 1/0025 |

FOREIGN PATENT DOCUMENTS

| | | | | |
|---|---|---|---|---|
| CN | 116343723 A * | 6/2023 | G06N 3/08 |
| EP | 3270379 A1 * | 1/2018 | G10L 19/005 |
| EP | 4383133 A1 * | 6/2024 | G06N 3/0455 |
| WO | 2021046541 A1 | 3/2021 | |
| WO | 2021097259 A1 | 5/2021 | |
| WO | 2022160054 A1 | 8/2022 | |
| WO | 2024118464 A1 | 6/2024 | |
| WO | 2024129331 A1 | 6/2024 | |
| WO | WO-2024184745 A1 * | 9/2024 | |

OTHER PUBLICATIONS

Borsos Z. et al.: “AudioLm: A language modeling approach to audio generation”, IEEE/ACM Transactions on Audio, Speech, and Language Processing, 2023.
Chung, H.W. et al.: “Scaling instruction-finetuned language models”, arXiv preprint arXiv:2210.11416, 2022.
Copet, J. et al.: “Simple and controllable music generation”, arXiv preprint arXiv:2306.05284, 2023.
Creswell, A. et al.: “Generative adversarial networks: An overview”, IEEE signal processing magazine, 35(1):53-65, 2018.
Defossez, A. et al.: “High fidelity neural audio compression”, arXiv preprint arXiv:2210.13438, 2022.
Dhariwal, P. et al.: “Jukebox: A generative model for music”, arXiv preprint arXiv:2005.00341, 2020.
Elizalde, B. et al.: “Clap learning audio concepts from natural language supervision”, In ICASSP 2023-2023 IEEE International Conference on Acoustics, Speech and Signal Processing (ICASSP), pp. 1-5. IEEE, 2023.
Garbacea, C. et al.: “Low bit-rate speech coding with vq-vae and a wavenet decoder”, In ICASSP 2019-2019 IEEE International Conference on Acoustics, Speech and Signal Processing (ICASSP), pp. 735-739. IEEE, 2019.
Gemmeke, J.F., et al.: “Audio set: An ontology and human-labeled dataset for audio events”, In 20/7 IEEE international conference on acoustics, speech and signal processing (ICASSP), pp. 776-780. IEEE, 2017.
Ghosal, D. et al.: “. Text-to-audio gen.eration using instruction-tuned Ilm and latent diffusion model”, arXiv preprint arXiv:2304.1373, 2023.
Hawthorne, C. et al.: “General- purpose, long-context autoregressive modeling with perceiver ar”, In International Conference on Machine Learning, pp. 8535-8558. PMLR, 2022.
Hertz, A. et al.: “Prompt-to-prompt image editing with cross attention control”, arXiv preprint arXiv:2208.01626, 2022.
Ho, J. et al.: “Classifier-free diffusion guidance”, arXiv preprint, arXiv:2207.12598, 2022.
Ho, J. et al.: “Denoising diffusion probabilistic models”, Advances in neural information processing systems, 33:6840-6851, 2020.
Huang, Q. et al.: “Noise2music: Text-conditioned music generation with diffusion models”, arXiv preprint arXiv:2302.03917, 2023.
Huang, R. et al.: “Make-an-audio: Text-to-audio generation with prompt-enhanced diffusion models”, arXiv preprint arXiv:2301.12661, 2023.
International Search Report and Written Opinion PCT/IB2024/059047 dated Jan. 14, 2025; 10 pages.
Kilgour, K. et al.: “Frechet audio distance: A reference-free metric for evaluating music enhancement algorithms”, In INTERSPEECH, pp. 2350-2354, 2019.
Kong, J. et al.: “Hifi-gan: Generative adversarial networks for efficient and high fidelity speech synthesis”, Advances in Neural Information Processing Systems, 33: 17022-17033, 2020.
Kong, Z. et al.: Diffwave: A versatile diffusion model for audio synthesis. arXiv preprint arXiv:2009.09761, 2020.
Kreuk, F. et al.: “Audiogen: Textually guided audio generation”, arXiv preprint arXiv:2209.15352, 2022.
Liu, H. et al.: “Audioldm: Text-to-audio generation with latent diffusion models”, arXiv preprint arXiv:2301.12503, 2023.
Loshchilov, I. et al.: “ Decoupled weight decay regularization”, arXiv preprint arXiv: 1711.05101, 2017.
Marafioti, A. et al.: “A context encoder for audio inpainting”, IEEE/ACM Transactions on Audio, Speech, and Language Processing, 27(12): 2362-2372, 2019.
Muhamed, A. et al.: “Symbolic music generation with transformer-gans”, In Proceedings of the AAA! conference on artificial intelligence, vol. 35, pp. 408-417, 2021.
Rombach, R. et al.: “High resolution image synthesis with latent diffusion models”, In Proceedings of the IEEEICVF conference on computer vision and pattern recognition, pp. 10684-10695, 2022.
Rubenstein, P.K. et al.: “. Audiopalm: A large language model that can speak and listen”, arXiv preprint arXiv:2306.12925, 2023.
Saharia, C. et al.: “Photorealistic text-to-image diffusion models with deep language understanding”, Advances in Neural Information Processing Systems, 35:36479-36494, 2022.
Schneider, F. et al.: “Mousai Text-to-music generation with long-context latent diffusion”, arXiv preprint arXiv:2301.11757, 2023.
Steinwold: “AI + NFTs: What is an iNFT?”, Apr. 6, 2021, Available at: https://andrewsteinwold.substack. com/p/ai-nfts-what-is-an-inft-.
Van Den Oord, A. et al.: “Wavenet: A generative model for raw audio”, arXiv preprint arXiv: 1609.03499, 2016.
Van Der Oord, A. et al.: “Neural discrete representation learning”, Advances in neural information processing systems, 30, 2017.
Van Erven, T. et al.: “Renyi divergence and kullback-leibler divergence”, IEEE Transactions on Information Theory, 60(7):3797-3820, 2014.
Vaswani, A. et al.: “Attention is all you need”, Advances in neural information processing systems, 30, 2017.
WO Publication 2022160054 Aug. 2022 (Year: 2022).
Yang, D. et al.: “Diffsound: Discrete diffusion model for text-to-sound generation”, IEEE/ACM Transactions on Audio, Speech, and Language Processing, 2023.

(56) References Cited

OTHER PUBLICATIONS

Yu, Y. et al.: "Conditional lstm-gan for melody generation from lyrics", ACM Transactions on Multimedia Computing, Communications, and Applications (TOMM), 17(1): 1-20, 2021.
Zeghidour, N. et al.: "Soundstream: An end-to-end neural audio codec", IEEE/ACM Transactions on Audio, Speech, and Language Processing, 30:495-507, 2021.
Zhu, Hongyuan, et al., "Pop Music Generation: From Melody to Multi-style Arrangement", ACM Transactions on Knowledge Discovery from Data (TKDD), 14(5): 1-31, 2020.

* cited by examiner

ARTIFICIAL INTELLIGENCE MUSIC GENERATION MODEL AND METHOD FOR CONFIGURING THE SAME

RELATED APPLICATION DATA

This application claims priority to U.S. Provisional Patent Application Ser. No. 63/531,693 filed on Aug. 9, 2023, the entire disclosure of which is hereby incorporated herein by reference.

FIELD OF INVENTION

The present disclosure relates to music generation using artificial intelligence, and more particularly to a system and method for configuring a learning model, and the resulting learning model, for high-fidelity text-guided music generation using masked autoencoders and omnidirectional latent diffusion models.

BACKGROUND

Music generation has attracted growing interest with the advancement of deep generative models. Advancements in this field have the potential to augment human creativity, enable new forms of human-Artificial Intelligence (AI) collaboration in music production, and expand access to personalized music experiences. However, generating high-fidelity and realistic music still poses unique challenges compared to other modalities, such as text generation, or image generation. Music utilizes the full frequency spectrum, requiring high sampling rates to capture intricacies. The blend of multiple instruments and arrangement of melodies and harmonies results in highly complex structures. Further, human hearing is very sensitive to musical dissonance and thus satisfactory music generation has been a challenge.

The intersection of text and music, known as text-to-music generation, offers valuable capabilities to bridge free-form textual descriptions and musical compositions. However, existing text-to-music models still exhibit notable limitations. Some models operate on spectrogram representations of music, incurring fidelity loss from audio conversion. Others employ inefficient autoregressive generation or cascaded models. Current training methods result in models that lack the versatility of humans who can freely manipulate music.

In the field of content synthesis, the implementation of conditional generative models often involves applying either autoregressive (AR) or non-autoregressive (NAR) models. The inherent structure of language, where each word functions as a distinct token and sentences are sequentially constructed from these tokens, makes the AR paradigm a more natural choice for language modeling. Thus, in the domain of Natural Language Processing (NLP), transformer-based models, e.g., the GPT series, have emerged as the prevailing approach for text generation tasks. AR methods rely on predicting future tokens based on visible history tokens. The likelihood is represented by:

$$p_{AR}(y \mid x) = \prod_{i=1}^{N} p(y_i \mid y_{1:i-1}; x) \tag{1}$$

where $y_i$ represents the i-th token in sequence y.

Conversely, in the domain of Computer Vision (CV), where images have no explicit time series structure and typically occupy continuous space, employing an NAR approach is deemed more suitable. Notably, the NAR approach, such as Stable Diffusion, has emerged as the dominant method for addressing image generation tasks. NAR approaches assume conditional independence among latent embeddings and generate them uniformly without distinction during prediction. This results in a likelihood expressed as:

$$p_{NAR}(y \mid x) = \prod_{i=1}^{N} p(y_i \mid x). \tag{2}$$

Although the parallel generation approach of NAR offers a notable speed advantage, it falls short in terms of capturing long-term consistency.

Diffusion models constitute probabilistic models explicitly developed for the purpose of learning a data distribution p(x). The overall learning of diffusion models involves a forward diffusion process and a gradual denoising process, each consisting of a sequence of T steps that act as a Markov Chain. In the forward diffusion process, a fixed linear Gaussian model is employed to gradually perturb the initial random variable $z_0$ until it converges to the standard Gaussian distribution. This process can be formally articulated as follows, $$q(z_t \mid z_0; x) = \mathcal{N}\left(z_t; \sqrt{\overline{\alpha}_t}\, z_0, (1 - \overline{\alpha}_t)I\right) \tag{3}$$

$$\overline{\alpha}_t = \prod_{i=1}^{t} \alpha_i,$$

where $\alpha_i$ is a coefficient that monotonically decreases with timestep t, and $z_t$ is the latent state at timestep t. The reverse process is to initiate from standard Gaussian noise and progressively utilize the denoising transition $p_\theta(z_t - 1 \mid z_t; x)$ for generation, $$p_\theta(z_t - 1 \mid z_t; x) = N(z_t - 1; \mu_\theta(z_t, t; x), \Sigma_\theta(z_t, t; x)), \tag{4}$$

where the mean $\mu_\theta$ and variance $\Sigma_\theta$ are learned from the model. We use predefined variance without trainable parameters following. After simply expansion and re-parameterizing, our training objective of the conditional diffusion model can be denoted as:

$$\mathcal{L} = \mathbb{E}_{z_0, \epsilon \sim \mathcal{N}(0,1), t}\left[\lVert \epsilon - \epsilon_\theta(z_t, t) \rVert_2^2\right], \tag{5}$$

where tis uniformly sampled from {1, . . . , T}, $\epsilon$ is the ground truth of the $\epsilon_\theta(\cdot)$ sampled noise, and is the noise predicted by the diffusion model.

Many existing approaches to music generation struggle to balance computational efficiency with generation quality. Models with high parameter counts can produce impressive results but can be impractical for real-time applications or deployment on resource-constrained devices. Conversely, more lightweight models can sacrifice audio fidelity, diversity, or controllability. Furthermore, capturing long-term dependencies and maintaining coherence throughout a musical piece remains challenging. Music inherently contains complex temporal structures spanning multiple timescales, from beat-level rhythms to phrase-level melodies and songlevel composition. Effectively modeling these dependencies while allowing for creative variation has proven to be difficult. Known music generation systems have limitations in producing high-fidelity audio, responding to diverse textual prompts, and offering flexible control over musical attributes.

SUMMARY

This summary is provided to introduce a selection of concepts in a simplified form that are further described below in the Detailed Description. This summary is not intended to identify key features or essential features of the claimed subject matter, nor is it intended to define the scope of the claimed subject matter.

The conventional diffusion model is a non-autoregressive model, which poses challenges in effectively capturing sequential dependencies in music flow. To address this limitation, disclosed implementations provide an integrated framework that leverages both unidirectional and bidirectional training. These adaptations allow for precise control over the contextual information used to condition predictions, enhancing the model's ability to capture sequential dependencies in music data.

Disclosed implementations take the approach that audio data can be regarded as a hybrid form of data. More specifically, audio data exhibits characteristics akin to images, as it resides within a continuous space that enables the modeling of high-quality music. Additionally, audio shares similarities with text in its nature as a time-series data. Consequently, disclosed implementations present a novel approach in generative AI model design, which includes the amalgamation of both the auto-regressive and non-autoregressive modes into a cohesive omnidirectional diffusion model.

Disclose implementations include an omnidirectional 1D diffusion model that combines bidirectional and unidirectional modes, offering a unified approach for universal music generation conditioned on either text or music representations. The model can operate in a noise-robust latent embedding space obtained from a masked audio autoencoder, enabling high-fidelity reconstruction from latent embeddings with a low frame rate. In contrast to prior generation models that use discrete tokens or involve multiple serial stages, the disclosed implementations offer a unique modeling framework capable of generating continuous, high-fidelity music using a single model. The disclosed implementations effectively utilize both autoregressive training to improve sequential dependency and non-autoregressive training to enhance sequence generation concurrently. By employing in-context learning and multi-task learning, one of the significant advantages of the disclosed implementations is support for conditional generation based on either text or melody, enhancing adaptability to various creative scenarios. This flexibility allows the model to be applied to different music generation tasks, making it a versatile and powerful tool for music composition and production.

Disclosed implementations provide a method for configuring a learning model for music generation. The method includes training a masked autoencoder with training data, the training data including a combination of, 1) a reconstruction loss over time and frequency domains, and 2) a patch-based adversarial objective operating at different resolutions. The method also includes training an omnidirectional latent diffusion model based on music data represented in a latent space to obtain a pretrained diffusion model. The method further includes fine-tuning the pretrained diffusion model based on text-guided music generation, bidirectional music in-painting (interpolation), and unidirectional music continuation.

According to other implementations of the present disclosure, the method can include one or more of the following features. Fine-tuning the pretrained diffusion model based on text-guided music generation can include a bidirectional mode and a unidirectional mode, wherein the bidirectional mode allows all latent embeddings to attend to one another during the denoising process, thereby enabling the encoding of comprehensive contextual information from both preceding and succeeding directions and wherein the unidirectional mode restricts all latent embeddings to attend solely to their previous time counterparts to thereby facilitate the learning of temporal dependencies in music data. Fine-tuning the pre-trained diffusion model based on bidirectional music in-painting can comprise simulating a music inpainting process by randomly generating audio masks and applying the audio mask to obtain corresponding masked audio, wherein the masked audio serves as conditional in-context learning inputs. Fine-tuning the pre-trained diffusion model based on unidirectional music continuation can comprise simulating a music continuation process through the random generation of exclusive right-only masks. The omnidirectional latent diffusion model can include at least one convolutional block and at least one transformer block. "Exclusive right-only masks" are binary masks used during the training of diffusion models for unidirectional music continuation. These masks focus solely on the future parts of the music sequence, ensuring that the model learns to predict and generate the next segment based on the given past and current parts. In essence, they allow the model to train by only considering the known sequence while ignoring the yet-to-be-predicted future segments.

The foregoing general description of the illustrative embodiments and the following detailed description thereof are merely exemplary implementations of the teachings of this disclosure and are not restrictive.

BRIEF DESCRIPTION OF THE DRAWING

Non-limiting and non-exhaustive examples are described with reference to the attached Drawing in which.

DETAILED DESCRIPTION

The following description sets forth exemplary implementations of the present disclosure. It should be recognized, however, that such description is not intended as a limitation on the scope of the present disclosure. Rather, the description also encompasses combinations and modifications to those exemplary implementations described herein.

The present disclosure provides a method and system for generating music based on textual input and a method for training AI models in the system. The system leverages a masked autoencoder and an omnidirectional latent diffusion model to generate high-fidelity music. The masked autoencoder is trained with a combination of: 1) a reconstruction loss over time and frequency domains; and 2) a patch-based adversarial objective operating at different resolutions. The omnidirectional latent diffusion model is trained based on music data represented in a latent space to obtain a pre-trained diffusion model.

The pretrained diffusion model is then fine-tuned based on text-guided music generation, bidirectional music in-painting, and unidirectional music continuation. "Fine-tuning" is a process used in machine learning to adapt a pre-trained model to perform better on a specific task or dataset. It involves making small adjustments to the model's parameters, which model has already been trained on a large, general dataset, so that the model can learn from a smaller, task-specific dataset. In contrast to prior methods that solely rely on a single text-guided learning objective, disclosed implementations adopt a novel approach by simultaneously incorporating multiple generative learning objectives while sharing common parameters.

Figure 1:
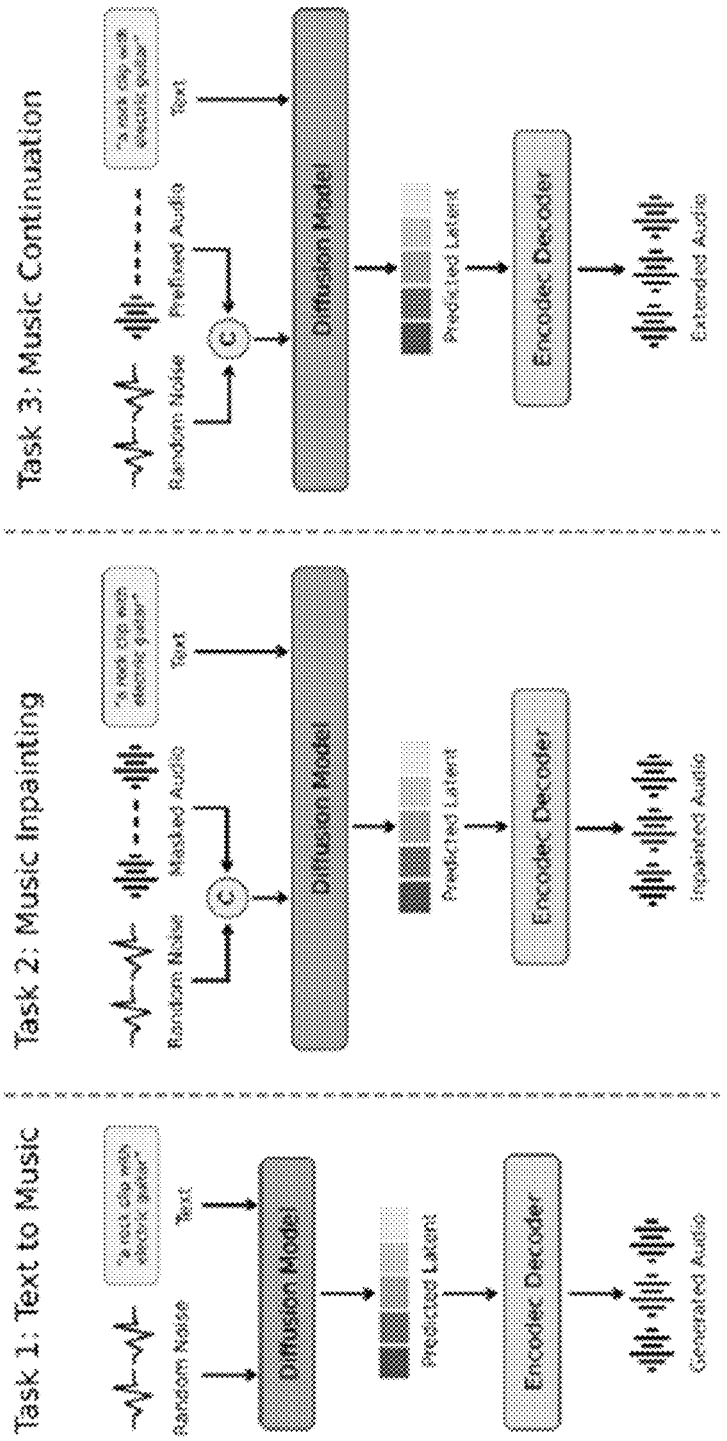
FIG. 1 is a block diagram of a computing architecture in accordance with disclosed implementations illustrating the fine tuning of the model.

As Shown in FIG. 1, the fine-tuning/training process encompasses three distinct music generation tasks: bidirectional text-guided music generation, bidirectional music in-painting, and unidirectional music continuation. The utilization of multi-task training allows for a cohesive and unified training procedure across all desired music generation tasks. This approach enhances the model's ability to generalize across tasks, while also improving the handling of music sequential dependencies and the concurrent generation of sequences.

This multi-task fine-tuning approach allows the system to generate diverse and realistic music that is coherent with the context music and has the correct style described by the text. The system's ability to directly model waveforms (instead of using spectrograms) and to combine auto-regressive and non-autoregressive training, results in the generation of high-quality music at, for example, a 48 kHz sampling rate. The system's versatility and computational efficiency make it a powerful tool for music composition and production.

In some implementations, the system architecture for configuring a learning model for music generation can include a masked autoencoder and an omnidirectional latent diffusion model. The masked autoencoder can be trained with training data, which can include a combination of a reconstruction loss over time and frequency domains, and a patch-based adversarial objective operating at different resolutions. The training data can be input into the masked autoencoder, and in some cases, a certain percentage of each instance of the training data can be masked. This masking process serves to enhance the robustness of the decoder in the autoencoder, enabling it to reconstruct high-quality data even when exposed to corrupted inputs.

The omnidirectional latent diffusion model can be trained based on music data represented in a latent space to obtain a pretrained diffusion model. The latent space can be a high-dimensional space where each dimension represents a specific feature or characteristic of the music data. The omnidirectional latent diffusion model can include at least one convolutional block and at least one transformer block. The convolutional block can be responsible for extracting local features from the music data, while the transformer block can be responsible for capturing long-range dependencies in the music data.

The pretrained diffusion model can then be fine-tuned based on various tasks, such as text-guided music generation, bidirectional music in-painting, and unidirectional music continuation, as noted above. In the text-guided music generation task, the pretrained diffusion model can be fine-tuned based on a bidirectional mode and a unidirectional mode. The bidirectional mode can allow all latent embeddings to attend to one another during the denoising process, thereby enabling the encoding of comprehensive contextual information from both preceding and succeeding directions. The unidirectional mode, on the other hand, can restrict all latent embeddings to attend solely to their previous time counterparts, thereby facilitating the learning of temporal dependencies in the music data.

Figure 2:
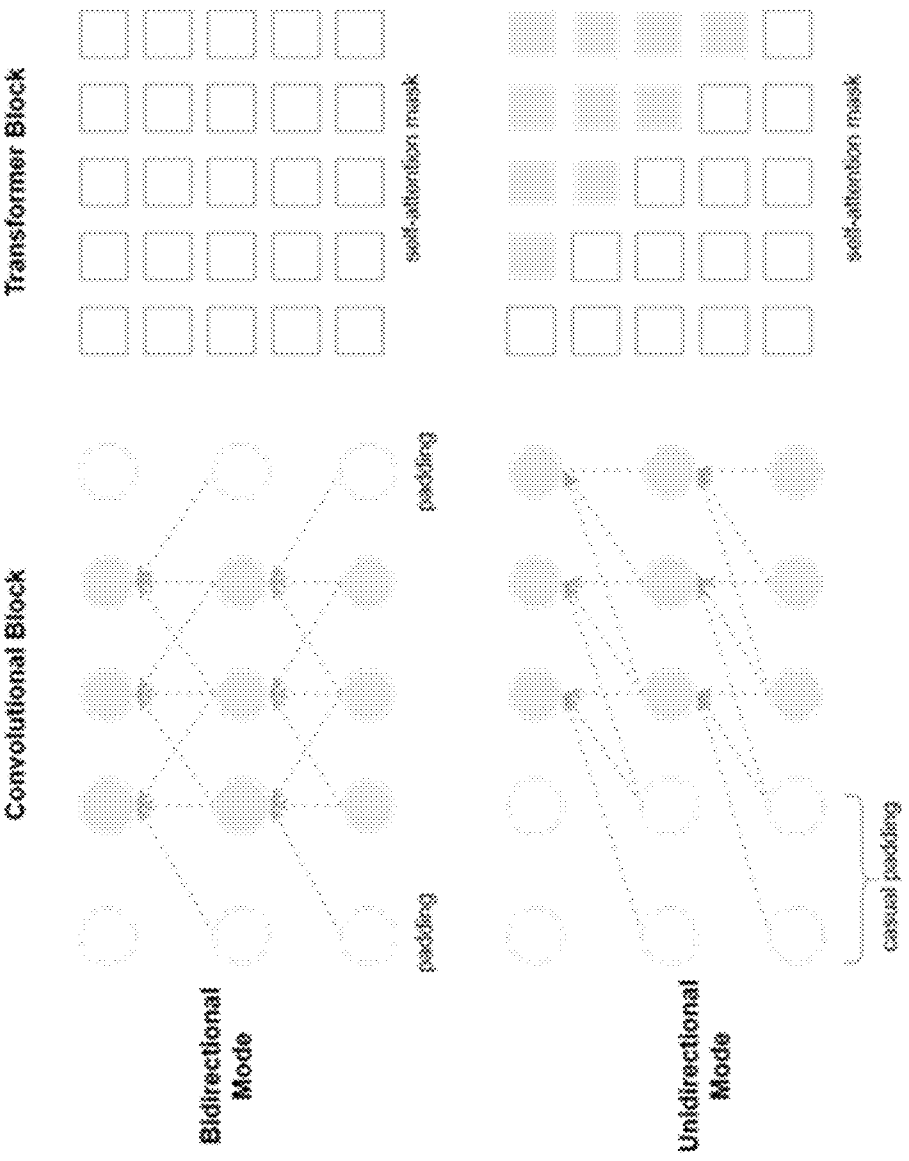
FIG. 2 is a diagram of a neural network used in the model showing the bidirectional and unidirectional nature of the fine-tuning process in accordance with disclosed implementations.

In the bidirectional music in-painting task, the pretrained diffusion model can be fine-tuned by simulating a music inpainting process. This process can involve randomly generating audio masks and applying the audio mask to obtain corresponding masked audio, which can serve as conditional in-context learning inputs. In the unidirectional music continuation task, the pretrained diffusion model can be fine-tuned by simulating a music continuation process through the random generation of exclusive right-only masks. FIG. 2 illustrates the bidirectional mode and unidirectional mode for the convolutional block and the transformer block. In the unidirectional mode, causal padding was used in the convolutional block and a masked self-attention mask was employed to attend only to the left context.

In some implementations, the system architecture can also include a text encoder for encoding textual input into a form that can be used to guide the music generation process. The text encoder can be a conventional transformer-based language model that is capable of capturing the semantic information in the textual input. The encoded textual input can then be used as additional conditioning information in the omnidirectional latent diffusion model, enabling the generation of music that is aligned with the textual input.

As noted above, the training process of the masked autoencoder can involve the use of training data. This training data can include a combination of a reconstruction loss over time and frequency domains, and a patch-based adversarial objective operating at different resolutions. The reconstruction loss can be calculated based on the difference between the original music data and the reconstructed music data produced by the autoencoder. This loss can be computed over both time and frequency domains (in a known manner), allowing the autoencoder to capture temporal and spectral characteristics of the music data. For example, the Focal Frequency Loss algorithm can be used to determine reconstruction loss in the frequency domain and the Mean Squared Error (MSE) algorithm can be used to determine reconstruction loss in the time domain.

A patch-based adversarial objective can be employed to enhance the quality of the reconstructed music data. This objective can operate at different resolutions, enabling the autoencoder to capture features of the music data at various scales. The adversarial objective can involve a competition between the autoencoder and a discriminator network. The autoencoder can strive to generate music data that the discriminator cannot distinguish from the original music data, while the discriminator can aim to accurately classify the music data as either original or generated. Through this adversarial process, the autoencoder can learn to generate high-quality music data.

As noted above, the training data input into the masked autoencoder can be partially masked. For example, 5 percent of each instance of the training data can be masked. This masking process can involve replacing a portion of the training data with a predetermined value or noise, rendering that portion of the data unobservable to the autoencoder during training, or any other known masking technique. This process can encourage the autoencoder to learn robust representations of the music data that are not overly reliant on any specific portion of the data. The percentage of the training data that is masked can vary. For example, in some embodiments, less than 5% of each instance of the training data can be masked, while in other embodiments, more than 5% of each instance of the training data can be masked. The specific percentage of the training data that is masked can be selected based on various factors, such as the complexity of the music data, the desired robustness of the autoencoder, or the computational resources available for training the autoencoder.

The masked autoencoder can be trained using a variety of optimization techniques. For example, gradient descent algorithms, such as stochastic gradient descent or Adam, can be used to iteratively adjust the parameters of the autoencoder to minimize the combined reconstruction loss and adversarial objective. The training process can continue until a stopping criterion is met, such as a predetermined number of training iterations, a target level of reconstruction loss, or a target level of adversarial objective.

In some implementations, the masked autoencoder can be configured to handle masked training data in various ways. For example, in some cases, the autoencoder can be configured to ignore the masked portions of the training data during the training process. In other cases, the autoencoder can be configured to attempt to reconstruct the masked portions of the training data based on the unmasked portions. This ability to handle masked training data can enhance the versatility and robustness of the autoencoder, enabling it to generate high-quality music data even when some portions of the input data are missing or corrupted.

In one example, the omnidirectional latent diffusion model can have an intermediate cross-attention dimension of 1024. The cross-attention dimension refers to the size of the intermediate representation used in the cross-attention mechanism of the model. The cross-attention mechanism can allow each element in the latent space to attend to all other elements, thereby enabling the model to capture complex dependencies between different features or characteristics of the music data.

In another example, the omnidirectional latent diffusion model can have a total of 746 million parameters. These parameters can include weights and biases in the model's neural network layers, as well as other parameters associated with the model's training and operation. The large number of parameters can allow the model to capture a wide range of complex patterns and dependencies in the music data, thereby enhancing the model's ability to generate high-quality music.

The training of the omnidirectional latent diffusion model can involve a variety of optimization techniques. For example, gradient descent algorithms, such as stochastic gradient descent or Adam, can be used to iteratively adjust the parameters of the model to minimize the loss function. The training process can continue until a stopping criterion is met, such as a predetermined number of training iterations, a target level of loss, or a target level of model performance.

The training of the omnidirectional latent diffusion model can be performed on a large-scale music dataset. The dataset can include a wide variety of music genres, styles, and compositions, thereby providing a rich source of training data for the model. The use of a large-scale music dataset can enhance the model's ability to generalize to a wide range of music generation tasks. The training of the omnidirectional latent diffusion model can also involve regularization techniques to prevent overfitting. For example, dropout or weight decay can be used to add a penalty to the loss function for large weights, thereby encouraging the model to find simpler solutions that generalize better to unseen data.

In some implementations, the fine-tuning process of the pretrained diffusion model can be based on text-guided music generation. This process can involve using a language model, such as FLAN-T5, to extract text embeddings from the textual input. The text embeddings can serve as additional conditioning information for the diffusion model, guiding the generation of music that aligns with the textual input.

The bidirectional music in-painting process can involve simulating a music inpainting process, which is a technique used to restore missing or corrupted segments within a music track. The simulation can involve randomly generating audio masks with mask ratios ranging from 20% to 80%. These masks can then be applied to the music data to obtain corresponding masked audio. The masked audio can serve as conditional in-context learning inputs for the omnidirectional latent diffusion model during the fine-tuning process.

The audio masks used in the music inpainting process can be generated using various techniques. For example, the masks can be generated using a random number generator, a noise generator, or a pattern generator. The specific technique used to generate the masks can depend on various factors, such as the complexity of the music data, the desired level of masking, or the computational resources available for the mask generation process.

The mask ratios used in the music inpainting process can vary. For instance, in some cases, less than 20% of the music data can be masked, while in other cases, more than 80% of the music data can be masked. The specific mask ratio can be selected based on various factors, such as the complexity of the music data, the desired level of inpainting, or the computational resources available for the inpainting process.

The masked audio obtained from the music inpainting process can serve as conditional in-context learning inputs for the omnidirectional latent diffusion model. These inputs can guide the model in generating music that fills in the masked portions of the music data, thereby restoring the missing or corrupted segments. The use of masked audio as conditional in-context learning inputs can enhance the model's ability to generate high-quality music that is coherent with the original music data.

The fine-tuning process based on bidirectional music in-painting can be performed on a large-scale music dataset. The dataset can include a wide variety of music genres, styles, and compositions, thereby providing a rich source of training data for the fine-tuning process. The use of a large-scale music dataset can enhance the model's ability to generalize to a wide range of music inpainting tasks.

The unidirectional music continuation process can involve simulating a music continuation process, which is a technique used to generate a continuation of a given music track. The simulation can involve randomly generating exclusive right-only masks with varying mask ratios. These masks can then be applied to the music data to obtain corresponding masked audio. The masked audio can serve as conditional in-context learning inputs for the omnidirectional latent diffusion model during the fine-tuning process.

The mask ratios used in the music continuation process can vary. For instance, in some cases, less than 20% of the music data can be masked, while in other cases, more than 80% of the music data can be masked. The specific mask ratio can be selected based on various factors, such as the complexity of the music data, the desired level of continuation, or the computational resources available for the continuation process.

The masked audio obtained from the music continuation process can serve as conditional in-context learning inputs for the omnidirectional latent diffusion model. These inputs can guide the model in generating music that continues from the unmasked portions of the music data, thereby creating a seamless continuation of the original music track. The use of masked audio as conditional in-context learning inputs can enhance the model's ability to generate high-quality music that is coherent with the original music data.

The omnidirectional latent diffusion model can include at least one convolutional block and at least one transformer block. The convolutional block can be designed to extract local features from the music data. This block can include one or more convolutional layers, each of which can apply a set of learnable filters to the music data. The filters can be designed to detect specific features in the music data, such as pitch, rhythm, or timbre. The output of the convolutional block can be a set of feature maps that represent the presence of these features in the music data.

The convolutional block can include additional components, such as activation functions, pooling layers, or normalization layers. The activation functions can introduce non-linearity into the model, enabling it to capture complex patterns in the music data. The pooling layers can reduce the dimensionality of the feature maps, thereby reducing the computational complexity of the model. The normalization layers can standardize the feature maps, thereby improving the stability and convergence of the model during training.

The transformer block in the omnidirectional latent diffusion model can be designed to capture long-range dependencies in the music data. This block can include one or more self-attention mechanisms, each of which can allow each element in the latent space to attend to all other elements. This can enable the model to capture complex dependencies between different features or characteristics of the music data, thereby enhancing the model's ability to generate music that is coherent with the textual input.

The transformer block can include additional components, such as feed-forward networks, layer normalization, or residual connections. The feed-forward networks can transform the attention outputs into a suitable form for the next layer. The layer normalization can standardize the outputs of each layer, thereby improving the stability and convergence of the model during training. The residual connections can allow the model to learn identity functions, thereby facilitating the training of deep models.

In some implementations, the omnidirectional latent diffusion model can switch between a bidirectional mode and a unidirectional mode during training. In the bidirectional mode, all latent embeddings can be allowed to attend to one another during the denoising process, thereby enabling the encoding of comprehensive contextual information from both preceding and succeeding directions. In the unidirectional mode, all latent embeddings can be restricted to attend solely to their previous time counterparts, thereby facilitating the learning of temporal dependencies in the music data. The choice between the bidirectional mode and the unidirectional mode can depend on various factors, such as the complexity of the music data, the desired level of coherence between the generated music and the textual input, or the computational resources available for the training process.

The latent embedding space can be normalized in any known manner to improve the performance of the omnidirectional latent diffusion model. For example, the normalization process can involve adjusting the scale of the latent embeddings so that they have a mean of zero and a standard deviation of one. This can enhance the stability and convergence of the model during training, thereby improving the quality of the generated music. As an example, the dimension of the latent embedding can be 128. This dimensionality can be selected based on various factors, such as the complexity of the music data, the desired level of detail in the generated music, or the computational resources available for the training process. A higher dimensionality can allow the model to capture more complex patterns in the music data, while a lower dimensionality can reduce the computational complexity of the model.

The normalization process can be performed as a post-processing step after the training of the masked autoencoder and the omnidirectional latent diffusion model. This can allow the model to adapt to the normalized latent embedding space, thereby enhancing the quality of the generated music. In other cases, the normalization process can be performed as a pre-processing step before the training of the models, thereby reducing the computational complexity of the training process.

The omnidirectional latent diffusion model can utilize a U-Net architecture for modeling waveforms. The U-Net architecture is a known type of convolutional neural network that is designed to capture both local and global features in the music data. This architecture can include a series of down-sampling and up-sampling blocks that are interconnected via residual connections. Each down-sampling block can reduce the dimensionality of the input data, thereby capturing coarse-grained, global features of the music data. Each up-sampling block can increase the dimensionality of the data, thereby capturing fine-grained, local features of the music data.

In some cases, the U-Net architecture can be configured to operate with a hop size, i.e., the number of samples between successive frames in the music data, of 320. A hop size of 320 results in 125 Hz latent sequences for encoding 48 KHz music audio. This configuration can allow the U-Net architecture to capture a wide range of frequencies in the music data, thereby enhancing the quality of the generated music.

However, the hop size used in the U-Net architecture can vary. For instance, in some implementations, a smaller hop size can be used to capture more detailed features in the music data. In other implementations, a larger hop size can be used to capture more global features in the music data. The specific hop size can be selected based on various factors, such as the complexity of the music data, the desired level of detail in the generated music, or the computational resources available for the training process.

The above-noted cross-attention layer can be randomly replaced by a self-attention layer with a probability of 0.2 during the training process. The self-attention layer can restrict each element in the latent space to attend only to its previous time counterparts, thereby facilitating the learning of temporal dependencies in the music data. This random replacement of the cross-attention layer with a self-attention layer can introduce variability into the training process, thereby enhancing the robustness and versatility of the model.

The probability of replacing the cross-attention layer with a self-attention layer can vary. For instance, in some cases, the probability can be less than 0.2, while in other cases, the probability can be more than 0.2. The specific probability can be selected based on various factors, such as the complexity of the music data, the desired level of temporal dependency learning, or the computational resources available for the training process.

The system can employ Classifier-Free Guidance (CFG) during the inference process to improve the correspondence between the generated music samples and the textual conditions. CFG is a technique used in the field of generative models, particularly diffusion models, that generates data by reversing a diffusion process. CFG allows for a trade-off between the diversity of generated samples and their fidelity to a given condition, such as a text prompt, without the need for an external classifier. The classifier-free guidance algorithm can operate by adjusting the parameters of the omnidirectional latent diffusion model to minimize a loss function that measures the difference between the model's predictions and the actual music data. This process can enhance the model's ability to generate music that aligns with the textual input, thereby improving the quality of the generated music.

In some cases, the classifier-free guidance process can be performed during the fine-tuning process of the pretrained diffusion model. This can involve adjusting the parameters of the model based on the classifier-free guidance algorithm, thereby enhancing the model's ability to generate music that aligns with the textual input. The use of classifier-free guidance during the fine-tuning process can enhance the model's ability to generalize to a wide range of music generation tasks.

The system can balance the generation quality and computational efficiency during the inference process by adjusting the parameters of the omnidirectional latent diffusion model and the masked autoencoder to optimize both the quality of the generated music and the computational resources required for the generation process. For example, the system can use a larger hop size in the U-Net architecture to reduce the computational complexity of the model, while using a higher dimensionality in the latent embedding to capture more detailed features in the music data. This balance between generation quality and computational efficiency can enhance the system's ability to generate high-quality music in a computationally efficient manner.

The training process and the system can be adjusted to obtain an desired balance between generation quality and computational efficiency based on various factors, such as the complexity of the music data used as training data, the desired level of detail in the generated music, or the computational resources available for the generation process.

In one example, the training process can be performed on a specific hardware configuration. For instance, the system can be trained on 8 A100 GPUs. The use of multiple GPUs can allow for parallel processing of the training data, thereby speeding up the training process and enabling the system to handle large-scale music datasets. The specific hardware configuration used for the training process can be selected based on various factors, such as the size of the music dataset, the complexity of the music data, or the computational resources available for the training process. For example, the system can be trained for 200 k steps. Each training step can involve updating the parameters of the system based on a batch of training data. The specific number of training steps can be selected based on various factors, such as the complexity of the music data, the desired level of model performance, or the computational resources available for the training process.

As noted above, the training process can employ the use of various loss algorithms. For instance, the AdamW optimizer can be used to adjust the parameters of the system. The AdamW optimizer is a variant of the Adam optimizer that includes a weight decay regularization term. This optimizer can balance the speed of convergence and the stability of the learning process, thereby enhancing the performance of the system. The optimizer settings can be adjusted accordingly. For example, the learning rate can be linearly decayed from 3 $e^{-5}$. The learning rate controls the step size in the parameter update process, with a larger learning rate leading to larger steps and a faster convergence, but potentially less stable learning. The linear decay of the learning rate can allow the system to take large steps in the early stages of the training process when the parameters are far from their optimal values, and smaller steps in the later stages when the parameters are closer to their optimal values. As an example, the total batch size for optimization can be set to 512. The batch size controls the number of training examples used in each update of the parameters. A larger batch size can lead to more stable learning and better generalization performance, but can also require more computational resources. As an example, the $\beta_1$ and $\beta_2$ parameters of the AdamW optimizer can be set to 0.9 and 0.95, respectively. These parameters control the exponential decay rates for the moment estimates in the AdamW optimizer. The specific values of these parameters can be selected based on various factors, such as the complexity of the music data, the desired level of model performance, or the computational resources available for the training process.

As another example, a decoupled weight decay of 0.1 can be used in the training process. Weight decay is a regularization technique that adds a penalty to the loss function for large weights, thereby encouraging the system to find simpler solutions that generalize better to unseen data. The decoupled weight decay separates the weight decay from the optimization step, allowing for more precise control over the regularization process.

In some cases, gradient clipping can be used in the training process with a value of 1.0. Gradient clipping is a technique used to prevent the gradients from becoming too large, which can lead to unstable learning and poor model performance. The specific value for gradient clipping can be selected based on various factors, such as the complexity of the music data, the desired level of model performance, or the computational resources available for the training process.

Figure 3:
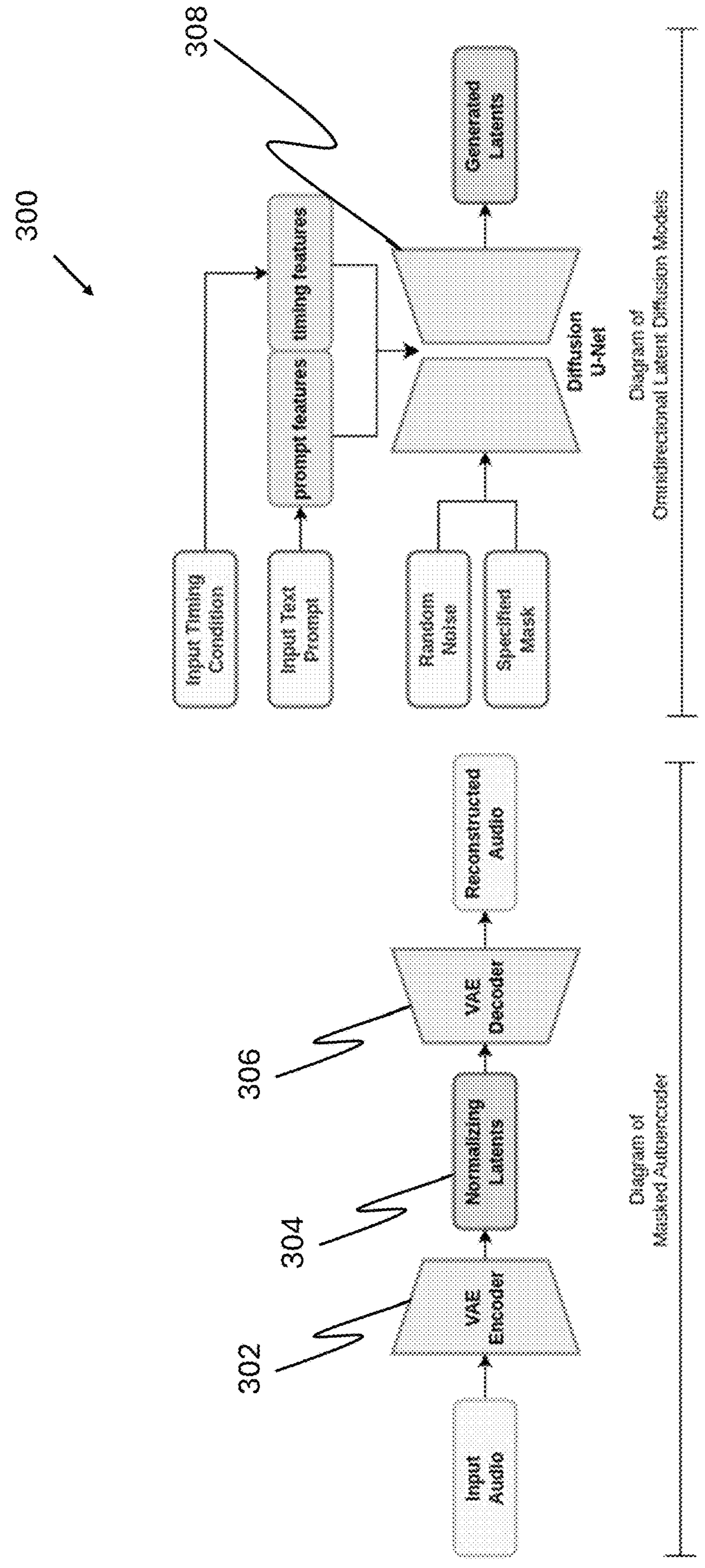
FIG. 3 is an architectural block diagram of a model in accordance with disclosed implementations.

A specific example of the disclosed implementations is set forth below along with test results demonstrating the improved operation of disclosed embodiments. FIG. 3 is a diagram of learning model 300 of the specific example discussed below. As shown in FIG. 3, the masked autoencoder can include a Variational Auto Encoder (VAE) 302 which creates latents corresponding to the input audio, a normalization layer 304, and VAE decoder 306 which creates the reconstructed audio. The omnidirectional latent diffusion model includes diffusion U-Net 308, which processes input in the manner described below to create generated latents.

To facilitate the training on limited computational resources without compromising quality and fidelity, a high fidelity audio autoencoder E can be used to compress original audio into latent representations z. Formally, given an two-channel stereo audio $x \in R^{T \times 2}$, the encoder E encodes x into a latent representation z=E(x), where $z \in R^{T \times c}$. While the decoder reconstructs the audio $\tilde{x}$=D(z)=D(E(x)) from the latent representation. The audio compression model of this example of the disclosed implementations is a modified version of the model disclosed by Zeghidour et al., Soundstream: An End-to-End Neural Audio Dodec. IEEE/ACM Transactions on Audio, Speech, and Language Processing, 30:495-507, 2021 and Defossez et al., High Fidelity Neural Audio Compression. arXiv preprint arXiv: 2210.13438, 2022.

By training with the combination of a reconstruction loss over both time and frequency domains and a patch-based adversarial objective operating at different resolutions, the audio reconstructions are confined to the original audio manifold by enforcing local realism and muffled effects (often introduced by relying solely on sample-space losses with L1 or L2 objectives) are avoided. Unlike the systems of Zeghidour et al., 2021 and Defossez et al., 2022 that employ a quantization layer to produce the discrete codes, the model of the disclosed implementations directly extracts the continuous embeddings without any quality-reducing loss due to quantization. This utilization of powerful autoencoder representations achieves a nearly optimal balance between complexity reduction and high-frequency detail preservation, leading to a significant improvement in music fidelity.

The masked autoencoder of this example is trained on 48 KHz stereophonic audios with large batch size and employ an exponential moving average to aggregate the weights. As a result of these enhancements, the performance of our audio autoencoder surpasses that of the original model in all evaluated reconstruction metrics, as shown in Table 2. Consequently, we adopt this audio autoencoder for all of our subsequent experiments.

In this example, the latent embedding space is normalized using the following algorithm:

Input: Existing latent embeddings $$\{z_i\}_{i=1}^{N}$$

and reduced dimension k

1: compute $$\mu \text{ and } \sum \text{ of } \{z_i\}_{i=1}^{N}$$

2: compute U,Λ,$U^T$=SVD(Σ)

$$W = \left(U\sqrt{\Lambda^{-1}}\right)[:, :k]$$

$$W$$

3: compute

4: zi=($z_i$−μ)

Output: Normalized latent embeddings $$\{\tilde{z}_i\}_{i=1}^{N}$$

To avoid arbitrarily scaled latent spaces, it is known to estimate the component-wise variance and re-scale the latent z to have a unit standard deviation. In contrast to previous approaches that only estimate the component-wise variance, This example of the disclosed implementations employs a straightforward yet effective postprocessing technique to address the challenge of anisotropy in latent embeddings as shown in the algorithm above. Specially, the mean value of the latent embedding is channel-wisely normalized to zero, and then the covariance matrix is transformed to the identity matrix via a Singular Value Decomposition (SVD) algorithm. A batch-incremental equivalent algorithm is implemented to calculate these transformation statistics. Also, a dimension reduction strategy is used to enhance the whitening process further and improve the overall effectiveness of the model.

In some prior approaches, time frequency conversion techniques, such as Mel-Spectrogram, have been employed for transforming the audio generation into an image generation problem. However, this conversion from raw audio data to Mel-Spectrogram data inevitably leads to a significant reduction in quality. To address this concern, this example directly leverages a temporal 1D efficient U-Net. This modified version of the Efficient U-Net effectively models the waveform and implements the required blocks in the diffusion model. The U-Net model's architecture comprises cascading down-sampling and up-sampling blocks interconnected via residual connections. Each down/up-sampling block consists of a down/up-sampling layer, followed by a set of blocks that involve 1D temporal convolutional layers, and self/cross-attention layers. Both the stacked input and output are represented as latent sequences of length T, while the diffusion time t is encoded as a single-time embedding vector that interacts with the model via the aforementioned combined layers within the down and up-sampling blocks. In the context of the UNet model, the input consists of the noisy sample denoted as $x_t$, which is stacked with additional conditional information (such as text prompt features and timing features), as shown in FIG. 3. The resulting output corresponds to the noise prediction during the diffusion process.

To achieve the multi-task training objectives noted above, various music generation tasks were formulated as text-guided in-context learning tasks. The common goal of these in-context learning tasks is to produce diverse and realistic music that is coherent with the context music and has the correct style described by the text. For in-context learning objectives, e.g., music in-painting task, and music continuation task, additional masked music information, which the model is conditioned upon, can be extracted into latent embeddings and stacked as additional channels in the input. More precisely, apart from the original latent channels, the U-Net block has 129 additional input channels (128 for the encoded masked audio and 1 for the mask itself).

To account for the inherent sequential characteristic of music, JEN integrates the unidirectional diffusion mode by ensuring that the generation of latent on the right depends on the generated ones on the left, a mechanism achieved through employing a unidirectional self-attention mask and a causal padding mode in convolutional blocks. In general, the architecture of the omnidirectional diffusion model enables various input pathways, facilitating the integration of different types of data into the model, resulting in versatile and powerful capabilities for noise prediction and diffusion modeling. During training, JEN could switch between a unidirectional mode and a bidirectional model without changing the architecture of the model. The parameter weight is shared for different learning objectives. As illustrated in FIG. 2, JEN could switch into the unidirectional (autoregressive) mode, i.e., the output variable depends only on its own previous values. Causal padding can be employed in all 1D convolutional layers, padding with zeros in the front so that we can also predict the values of early time steps in the frame. In addition, we employ a triangular attention mask following (Vaswani et al., 2017), by padding and masking future tokens in the input received by the self-attention blocks.

The test results below demonstrate that the disclosed implementations facilitate both music in-painting (interpolation) and music continuation (extrapolation) by employing the novel omnidirectional diffusion model. The conventional diffusion model, due to its non-autoregressive nature, has demonstrated suboptimal performance in previous studies. This limitation has impeded its successful application in audio continuation tasks. The use of the unidirectional mode ensures that the predicted latent embeddings exclusively attend to their leftward context within the target segment. Similarly, the music continuation process is simulated through the random generation of exclusive right-only masks.

The masked music autoencoder of the example uses a hop size of 320, resulting in 125 Hz latent sequences for encoding 48 kHz music audio. The dimension of latent embedding is 128. We randomly mask 5% of the latent embedding during training to achieve a noise-tolerant decoder. FLAN-T5, an instruct-based large language model, was used to provide superior text embedding extraction. For the omnidirectional diffusion model, the intermediate cross-attention dimension was set to 1024, resulting in 746 million parameters. During the multitask training, ⅓ of a batch was evenly allocated to each training task. In addition, classifier-free guidance was applied to improve the correspondence between samples and text conditions. During training, the cross-attention layer is randomly replaced by self-attention with a probability of 0.2. The models were trained on on 8 A100 GPUs for 200 k steps with the AdamW optimizer, a linear-decayed learning rate starting from 3 $e^{-5}$ a total batch size of 512 examples, $\beta_1$=0.9, $\beta_2$=0.95, a decoupled weight decay of 0.1, and gradient clipping of 1.0.

A total 5000 hours of private music data was used to train the example model. Specifically, high-quality licensed music tracks and instrument-only licensed music tracks were used. All music data consisted of full-length music sampled at 48 kHz with metadata composed of a rich textual description and additional tags information, e.g., genre, instrument, mood/theme tags, etc. The proposed method is evaluated using the MusicCaps benchmark, which consists of 5500 expert-prepared music samples, each lasting ten seconds, and a genre-balanced subset containing 1000 samples. To maintain fair comparison, objective metrics are reported on the unbalanced set, while qualitative evaluations and ablation studies are conducted on examples randomly sampled from the genre-balanced set.

For the quantitative assessments, the example was evaluated using both objective and subjective metrics. The objective evaluation includes three metrics: Frechet' Audio Distance (FAD), Kullback-Leibler Divergence (KL), and CLAP score (CLAP). FAD indicates the plausibility of the generated audio. A lower FAD score implies higher plausibility. To measure the similarity between the original and generated music, KL-divergence is computed over label probabilities using a state of-the-art audio classifier trained on AudioSet. A low KL score suggests that the generated music shares similar concepts with the reference music.

Additionally, the CLAP score was applied to quantify audio-text alignment between the track description and the generated audio, utilizing the official pre-trained CLAP model. For the qualitative assessments, human raters were involved in assessing two key implementations of the generated music: text-to-music quality (T2M-QLT) and alignment to the text input (T2M-ALI). Human raters were asked to provide perceptual quality ratings for the generated music samples on a scale of 1 to 100 in the text-to-music quality test. Further, in the text-to-music alignment test, raters were required to evaluate the alignment between the audio and text, also on a scale of 1 to 100. As shown in the table below, the performance of the example was compared with other state-of-the-art methods, including Riffusion, Mousai, MusicLM, MusicGen, and Noise2Music.

| | QUANTITATIVE | | | QUALITATIVE | |
|---|---|---|---|---|---|
| METHODS | FAD↓ | KL↓ | CLAP↑ | T2M-QLT↑ | T2M-ALI↑ |
| Riffusion | 14.8 | 2.06 | 0.19 | 72.1 | 72.2 |
| Mousai | 7.5 | 1.59 | 0.23 | 76.3 | 71.9 |
| MusicLM | 4.0 | — | — | 81.7 | 82.0 |
| Noise2Music | 2.1 | — | — | — | — |
| MusicGen | 3.8 | 1.22 | 0.31 | 83.8 | 79.5 |
| Example | 2.0 | 1.29 | 0.33 | 85.7 | 82.8 |

These competing approaches were all trained on large-scale music datasets and demonstrated state of-the-art music synthesis ability given diverse text prompts. To ensure a fair comparison, the performance on the MusicCaps test set was evaluated from both quantitative and qualitative implementations. Since the implementation is not publicly available, the MusicLM public API was used for the tests. For Noise2Music, on the FAD score was reported. Experimental results demonstrate that the example of the disclosed implementations outperforms other competing baselines concerning both text-to-music quality and text-to-music alignment. Specifically, the example exhibits superior performance in terms of FAD and CLAP scores, outperforming the second-highest method Noise2Music and MusicGen by a large margin. Regarding the human qualitative assessments, The example consistently achieves the best T2M-QLT and T2M-ALI scores. It is noteworthy that the example is more computationally efficient with only 22.6% of MusicGEN (746 M vs. 3.3 B parameters) and 57.7% of Noise2Music (746 M vs. 1.3 B parameters).

To assess the effects of the omnidirectional diffusion model, different configurations, including the effect of model configuration and the effect of different multitask objectives, were compared. All ablations are conducted on 1K genre-balanced samples, randomly selected from the held-out evaluation set. As illustrated in the table below, the results demonstrate that:

i) The example incorporates the auto-regressive mode greatly benefiting the temporal consistency of generated music, leading to better music quality;

ii) the multi-task learning objectives, i.e., text-guided music generation, music in-painting, and music-continuation, improve task generalization and consistently achieve better performance; and iii) all these dedicated designs together lead to high-fidelity music generation without introducing any extra training cost.

In comparison to other methods, the disclosed implementations exhibit a remarkable balance between simplicity and efficiency by avoiding complex multistage models and eliminating the necessity for multiple inference steps. Notably, disclosed implementations achieve superior inference speed compared to other methods even with better generation quality. Moreover, in accordance with user requirements, the sampling scheduler within the diffusion model enables customization of the number of sampling steps to attain an optimal balance between inference speed and generation quality.

| | QUANTITATIVE | | | QUALITATIVE | |
|---|---|---|---|---|---|
| | | | | T2M- | T2M- |
| CONFIGURATION | FAD↓ | KL↓ | CLAP↑ | QLT↑ | ALI↑ |
| baseline | 3.1 | 1.35 | 0.31 | 80.1 | 78.3 |
| + auto-regressive mode | 2.5 | 1.33 | 0.33 | 82.9 | 79.5 |
| + music in-painting task | 2.2 | 1.28 | 0.32 | 83.8 | 80.1 |
| + music continuation ta: | 2.0 | 1.29 | 0.33 | 85.7 | 82.8 |

The disclosed implementations provide a powerful and efficient text-to-music generation framework that outperforms existing methods in both efficiency and quality of generated samples. Through directly modeling waveforms instead of mel-spectrograms, combining auto-regressive and non-autoregressive training, and multi-task training objectives, the disclosed implementations are able to generate high-quality music at 48 KHz sampling rate. The integration of diffusion models and masked autoencoders further enhances the ability of the disclosed implementations to capture complex sequence dependencies in music.

A number of implementations have been described. Nevertheless, it will be understood that various modifications can be made without departing from the spirit and scope of the disclosure. Accordingly, other implementations are within the scope of the following claims.

What is claimed:

1. A method for configuring a learning model for music generation, the method comprising:

providing a masked autoencoder which executes on a computing device;

providing an omnidirectional latent diffusion model which executes on a computing device, and which is operatively coupled to the masked autoencoder to process latent embeddings produced by the masked autoencoder;

training the masked autoencoder with training data, the training data including a combination of a reconstruction loss over time and frequency domains, and a patch-based adversarial objective operating at different resolutions, including processing of first training data with the masked autoencoder, applying a first loss function to the results of the processing of the first training data by the masked autoencoder, and adjusting parameters of the masked autoencoder in accordance with the loss function;

configuring a pretrained diffusion model by training the omnidirectional latent diffusion model based on music data represented in a latent space to obtain a pretrained diffusion model, including processing of second training data with the omnidirectional latent diffusion model, applying a second loss function to the results of the processing of the second training data by the omnidirectional latent diffusion model, and adjusting parameters of the omnidirectional latent diffusion model in accordance with the loss function;

fine-tuning the pretrained diffusion model based on text-guided music generation;

fine-tuning the pretrained diffusion model based on bidirectional music in-painting; and fine-tuning the pretrained diffusion model based on unidirectional music continuation.

2. The method of claim 1, wherein a data masking percentage of the masked autoencoder is 5 percent.

3. The method of claim 1, wherein fine-tuning the pretrained diffusion model based on text-guided music generation includes a bidirectional mode and a unidirectional mode, wherein the bidirectional mode allows the latent embeddings to attend to one another during a denoising process, and wherein the unidirectional mode restricts the latent embeddings to attend solely to previous time counterparts thereof.

4. The method of claim 1, wherein fine-tuning the pretrained diffusion model based on bidirectional music inpainting comprises simulating a music inpainting process by randomly generating audio masks and applying the audio mask to obtain corresponding masked audio, wherein the masked audio serves as conditional in-context learning inputs into the diffusion model in the process of fine-tuning the pretrained diffusion model.

5. The method of claim 1, wherein fine-tuning the pretrained diffusion model based on unidirectional music continuation comprises simulating a music continuation process through the random generation of exclusive right-only masks.

6. The method of claim 1, wherein the omnidirectional latent diffusion model includes at least one convolutional block and at least one transformer block.

7. The method of claim 6, wherein the at least one convolutional block includes causal padding in a unidirectional mode to restrict the latent embeddings to attend solely to previous time counterparts thereof.

8. A system for music generation, comprising:

a masked autoencoder, executed on a computing device and trained with training data including a combination of a reconstruction loss over time and frequency domains, and a patch-based adversarial objective operating at different resolutions, wherein the training of the masked autoencoder includes processing of first training data with the masked autoencoder, applying a first loss function to the results to the processing of the first training data by the masked autoencoder, and adjusting parameters of the masked autoencoder in accordance with the loss function;

a pretrained omnidirectional latent diffusion model operatively coupled to the masked autoencoder to process latent embeddings produced by the masked autoencoder and which is trained based on music data represented in a latent space to obtain a pretrained diffusion model, wherein the training of the pretrained omnidirectional latent diffusion model includes processing of second training data with an omnidirectional latent diffusion model, applying a second loss function to the results of the processing of the second training data by the omnidirectional latent diffusion model, and adjusting parameters of the omnidirectional latent diffusion model in accordance with the loss function; and wherein the pretrained omnidirectional latent diffusion model is fine-tuned based on text-guided music generation, bidirectional music in-painting, and unidirectional music continuation.

9. The system of claim 8, wherein a masking percentage of the masked autoencoder is 5 percent.

10. The system of claim 8, wherein fine-tuning the pretrained diffusion model based on text-guided music generation includes a bidirectional mode and a unidirectional mode, wherein the bidirectional mode allows the latent embeddings to attend to one another during a denoising process, and wherein the unidirectional mode restricts the latent embeddings to attend solely to previous time counterparts thereof.

11. The system of claim 8, wherein fine-tuning the pretrained diffusion model based on bidirectional music inpainting comprises simulating a music inpainting process by randomly generating audio masks and applying the audio masks to obtain corresponding masked audio into the diffusion model in the process of fine-tuning the pretrained diffusion model.

12. The system of claim 11, wherein the masked audio serves as conditional in-context learning inputs.

13. The system of claim 8, wherein fine-tuning the pretrained diffusion model based on unidirectional music continuation comprises simulating a music continuation process through random generation of exclusive right-only masks.

14. The system of claim 8, wherein the pretrained omnidirectional latent diffusion model includes at least one convolutional block and at least one transformer block, and wherein the at least one convolutional block includes causal padding in a unidirectional mode to restrict latent embeddings to attend solely to their previous time counterparts thereof.

* * * * *